INVENTORS
ROBERT L. JAMES
HAROLD MOREINES
BY Herbert L. Davis
ATTORNEY

INVENTORS
ROBERT L. JAMES
HAROLD MOREINES
BY
ATTORNEY

United States Patent Office 3,436,635
Patented Apr. 1, 1969

3,436,635
PULSE WIDTH MODULATED SERVO DRIVE CONTROL SYSTEM
Robert L. James, Bloomfield, and Harold Moreines, Springfield, N.J., assignors to The Bendix Corporation, a corporation of Delaware
Filed Sept. 2, 1965, Ser. No. 484,547
Int. Cl. H02p 1/54, 5/46
U.S. Cl. 318—331                11 Claims

ABSTRACT OF THE DISCLOSURE

A pulse modulated servo drive control system in which energizing pulses are applied to a load winding of a direct current servomotor by a pulse width modulator in response to a direct current signal input and including means effective during intervals of interruption between the energizing pulses for sampling a back electromotive force generated in the load winding, means for storing the sampled electromotive force in a hold circuit, and means for generating a feedback signal voltage from the stored electromotive force which is periodically applied in opposition to the direct current signal input for damping the servomotor.

---

This invention relates to a pulse width modulated servo drive control system, and more particularly to a novel control network which may effectively drive a direct current motor (having a fixed direct current field) linearly in response to a direct current servo signal input and in which a rate feedback signal is obtained by sampling a pulse width modulated motor armature voltage.

An object of the invention is to provide a novel control network for a direct current motor including novel means to effect a rate feedback signal by sampling the armature voltage of the motor during intervals of interruption or off times of the driving pulses and at those times when the motor terminal voltage consists entirely of generated back electromotive forces.

Another object of the invention is to provide a novel control network for a direct current motor including novel means for effecting a rate feedback signal in the form of electrical pulses, together with means to amplify the rate feedback signal, convert the signal to a direct current type servo signal and combine the signal in an adder network with the original input direct current servo signal to render effective a rate loop.

Another object of this invention is to provide in a control network for a direct current motor novel means for controlling a pulse generator so as to obtain a pulse width modulation for driving the motor.

Another object of the invention is to provide in the control network for a direct current motor novel means for obtaining a rate feedback signal by sampling motor voltage during off times of the driving motor pulses.

Another object of the invention is to provide in such a control network novel means for converting a resulting feedback signal into a direct current servo signal.

Another object of the invention is to provide novel means for converting a direct current servo input signal into a pulse type signal for driving a direct current motor, together with novel means for sampling the motor voltage so as to obtain a rate feedback signal while eliminating the need for a tachometer type rate signal generator.

Another object of the invention is to provide such a servo motor control system in which through the elimination of the conventional tachometer type rate signal generator there may be effected a saving in the weight and volume of the eliminated signal generator reducing thereby the inertia of the motor assembly to improve the performance capabilities of the servo motor system.

Another object of the invention is to provide in such a servo motor control system novel means for interrupting the applied torque of the controlled servo motor periodically, and during the interval of interruption, sampling a back electromotive force generated by the motor; storing the sampled electromotive force in a hold circuit during the time of applying the torque to the motor, and then generating a continuous velocity signal from the stored electromotive force which may be used for damping the servo motor or for measuring velocity.

Another object of the invention is to provide in such a servo motor control system novel means for pulsing the torque of the controlled servo motor so as to effectively overcome static friction levels that may exist even for small errors, and effect high efficiency from a transistor drive controlling the servo motor as well as obtain from the back electromotive force generated by the controlled servo motor a continuous velocity signal applied back through the transistor drive so to provide a damping effect on the controlled servo motor.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

The pulse width modulated servo drive control system of the present invention is particularly adapted for use in controlling a direct current motor for positioning with extreme accuracy a device such as a telescope in a star tracking system.

Figure 1:
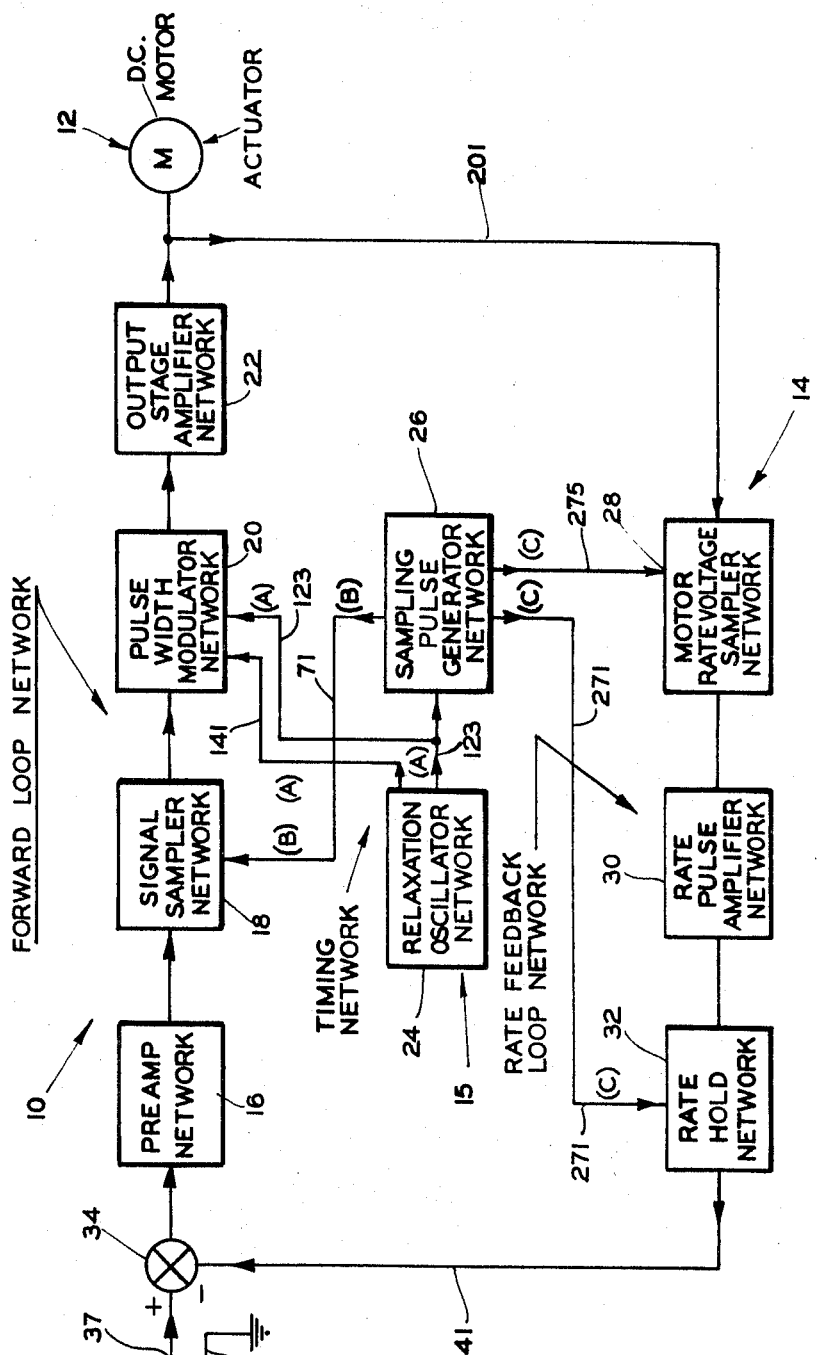
FIGURE 1 is a schematic block diagram illustrating a pulse width modulated servo drive control system embodying the invention.

Referring to the drawing of FIGURE 1, the system includes a forward loop network of a pulse width modulator type indicated generally by the numeral 10, a direct current motor actuator 12 and a rate feedback loop network 14, together with a timing network 15 for controlling the rate feedback loop network 14.

Included in the forward loop network 10 is a preamplifier network 16 of a novel arrangement to effect impedance matching, signal inverting and supplying quiescent bias requirements to a signal sampler network 18. The signal sampler network 18 samples the signal output from the preamplifier 16 superimposed on the quiescent bias output of the preamplifier network 16. The pulse width modulator 20 converts the amplitude modulated output of the signal sampler 18 to a constant amplitude recurring pulse having a pulse width proportional to the amplitude of the input signal.

An output stage amplifier network 22 delivers these pulses applied by the pulse width modulator network 20 to the direct current motor actuator 12. As hereinafter explained, the timing network 15 may include a relaxation oscillator network 24 and sampling pulse generator network 26 to supply required timing and sampling pulses to the motor rate voltage sampler network and rate hold network of the rate feedback loop network 14 and to the pulse width modulator network 20 and signal sampler network 18 of the forward loop network 10.

In the rate feedback loop network 14 there is provided the motor rate voltage sampler network 28 which samples the back electromotive forces at the direct current actuator motor 12 at regular recurring times between power driving pulses applied to the actuator motor 12.

A variable amplitude fixed duration output of the motor voltage sampler 28 is amplified by a rate pulse amplifier 30 and supplied to a rate hold circuit 32 which serves to hold the amplitude of the short duration pulse received from the rate hold amplifier 30 and delivers an equal amplitude direct current voltage at the adder network 34 to the input of the preamplifier 16 of the forward loop network 10 of the servo control system between said regular recurring times and thereby complete the rate feedback loop network 14.

Figure 2:
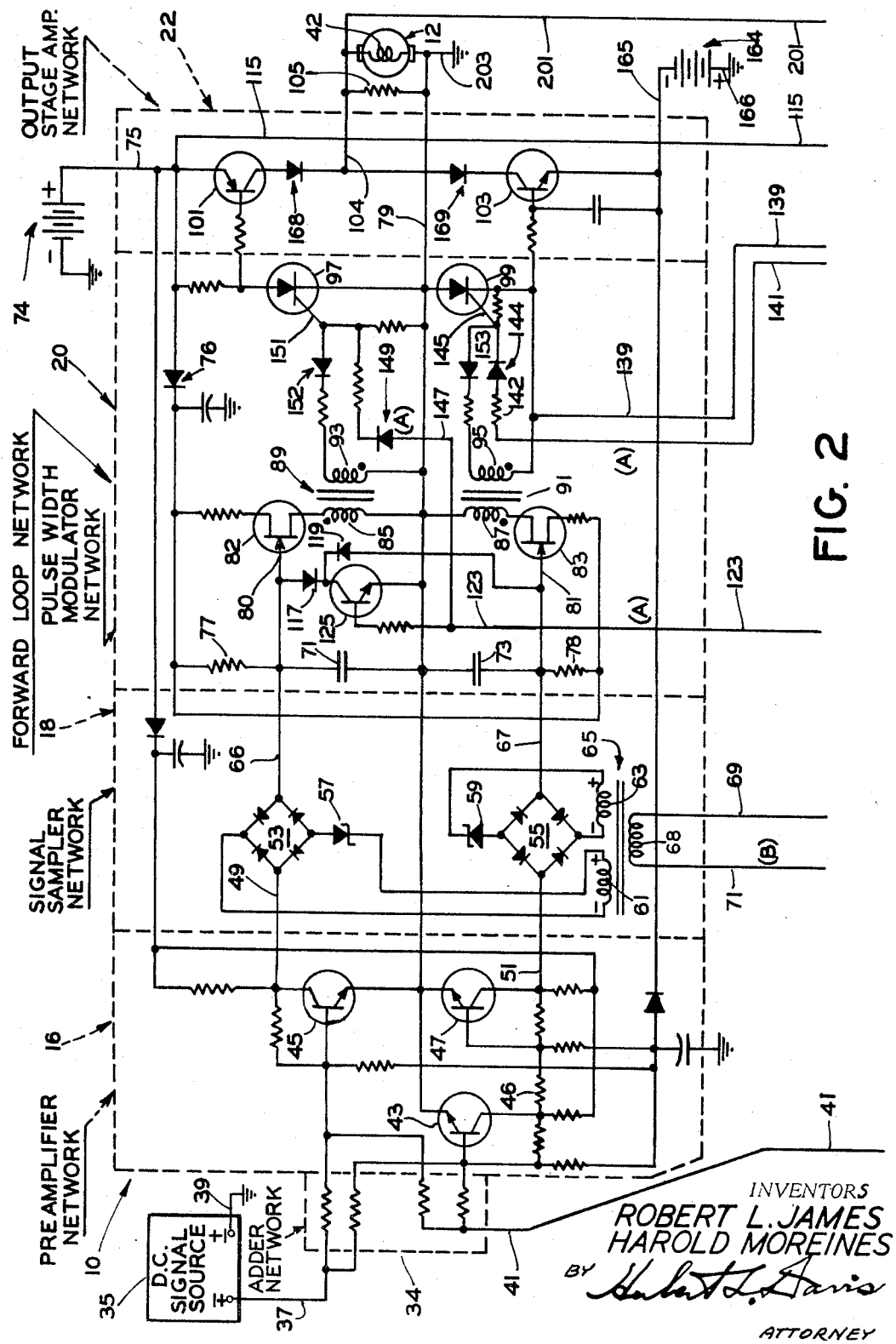
FIGURE 2 is a wiring diagram of the forward loop network of the servo drive control system of FIGURE 1.
Figure 3:
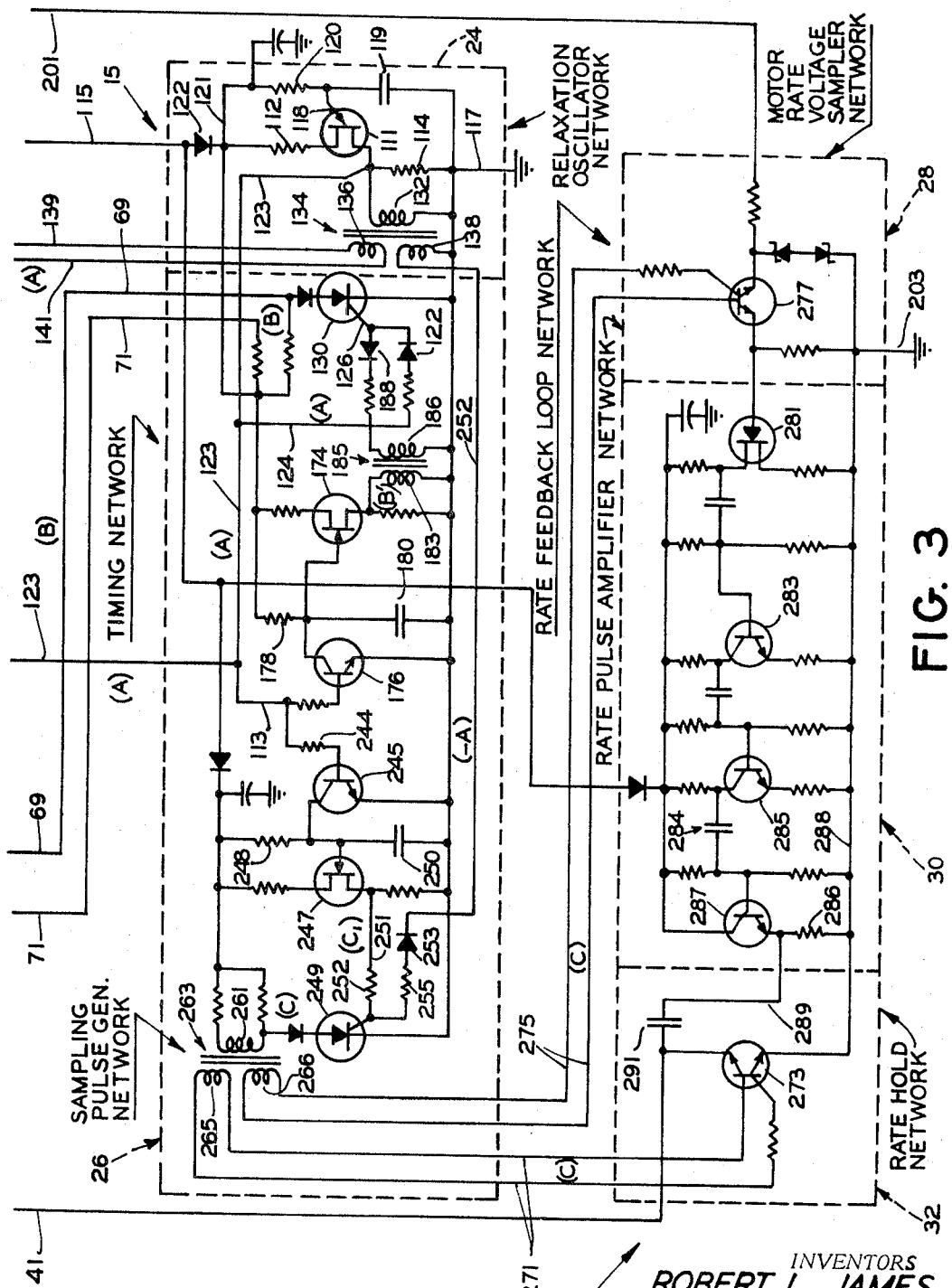
FIGURE 3 is a wiring diagram of the timing network and rate feedback loop network of the servo drive control system of FIGURE 1.

Referring now to FIGURES 2 and 3, the electrical network of the several components of the system of FIGURE 1 are shown in detail. A direct current signal source of conventional type and indicated by the numeral 35 supplies a direct current command voltage signal of variable amplitude and selected polarity across the conductors 37 and 39. The resistance adder network 34 combines this voltage signal with the follow up or rate feedback signal voltage of an amplitude variable directly with the velocity of the motor 12 and supplied through a conductor 41 from the output of the rate feedback loop network 14 so as to provide a direct current error voltage signal (obtained from subtraction of the command and rate feedback signals) applied through the preamplifier 16 to the signal sampler circuit 18 and thereby to the pulse width modulator 20 and output stage amplifier 22 to provide signal pulses across a control or load winding 42 of the actuator motor 12 which signal pulses have a width variable directly with the amplitude of the voltage of the direct current error signal. The preamplifier 16 is a two channel direct current amplifier including transistors 43, 45 and 47 of low voltage gain (large local feedback) so as to provide impedance matching to the signal sampler circuit 18 and a phase inversion to selectively provide two output signals at lines 49 and 51 of opposite phase dependent upon the polarity of the input command voltage signal at conductor 37 and thereby effect the high direct current bias levels needed for the unijunction transistor pulse circuits of the pulse width modulator 20.

In the operation of the preamplifier 16 it will be seen that upon a positive signal being applied to the input conductor 37 and thereby to the base of the transistor 45, the transistor 45 will be rendered more conductive and thus the collector output at the line 49 becomes less positive. Conversely the positive signal supplied through the input conductor 37 will be applied to the base of the transistor 43 which will cause the transistor 43 to become more conductive causing the collector output coupled through a resistor 46 to the base of the transistor 47 to become less positive and the transistor 47 less conductive so that the output line 51 from the collector of the transistor 47 becomes more positive. Thus upon a positive signal being applied at the input conductor 37, the output line 49 of the transistor 45 becomes less positive while the output line 51 from the transistor 47 becomes more positive.

If the operating conditions are reversed and a negative direct current signal is applied through the conductor 37, it will be seen that the negative bias then applied to the base of the transistor 45 will cause the transistor 45 to become less conductive and the output line 49 therefrom more positive and conversely the negative signal applied to the base of the transistor 43 will render the transistor 43 less conductive and thereby the transistor 47 coupled thereto more conductive so that the output line 51 leading from the collector of the transistor 47 will become less positive.

Of course, upon a zero signal being applied to the input conductor 37, the positive bias applied by the battery 74 to the collector of the transistor 45 and to the collector of the transistor 47 will provide output signals at the lines 49 and 51 of equal positive value. The output lines 49 and 51 lead from the preamplifier network 16 into the signal sampler network 18.

The signal sampler network 18 includes balanced diode bridges 53 and 55, Zener diodes 57 and 59 and secondary windings 61 and 63 of a pulse sampling transformer 65 having a primary winding 68 with conductors 69 and 71 leading to the forward loop network 10 of FIGURE 2 from the sampling pulse generator 26 of FIGURE 3 so as to control the operation of the signal sampler network 18, as hereinafter explained.

The lines 49 and 51 apply output signals of opposite phase from the preamplifier 16 dependent upon the polarity of the command signal voltage applied at input conductor 37. The balanced diode bridges 53 and 55 are so controlled as to rapidly connect and disconnect the outputs of the preamplifier transistors 45 and 47 to pulse generator charging capacitors 71 and 73 of the pulse width modulator 20. This action establishes initial charges on the capacitors 71 and 73 bearing linear relationship to the signal inputs at conductors 49 and 51.

These initial charges on the capacitors 71 and 73 determine the time at which relatively slowly rising ramp voltages applied at control emitters 80 and 81 of the unijunction switching transistors 82 and 83 reach the threshold firing levels of the unijunction switching transistors 82 and 83.

The foregoing is effected by the amplitude of the signal inputs at conductors 49 and 51 and also by the continued charging of the capacitors 71 and 73 from a source of direct current or battery 74 having a negative terminal connected to ground and a positive terminal connected through a conductor 75, diode 76 and high resistances 77 and 78 respectively to one plate of each of the capacitors 71 and 73 with the opposite plate of said capacitors connected to ground through a conductor 79.

Thus the ramp voltages applied at the control emitters 80 and 81 determine the time of the output pulses supplied through the unijunction transistors 82 and 83 to the respective primary windings 85 and 87 of coupling transformers 89 and 91 having secondary windings 93 and 95 which in turn serve to control silicon controlled rectifiers or trigistors 97 and 99. These output pulses are used to turn "off" the trigistors 97 and 99 which previously had been turned "on" by the action of reference pulse A just before initial charges were placed on the capacitors 71 and 73 by the action of the sampling pulse B.

The outputs of the trigistors 97 and 99 therefore are pulses having a width or duration modulated directly with the amplitude of the direct current input signal voltages supplied at conductors 49 and 51 since the trigistors 97 and 99 are periodically turned on at a set time and turned off at a later time depending on the amplitude of the input signal error voltage applied through the adder circuit 34 by the command signal voltage at the conductor 37 as modified by the rate feedback signal voltage applied through conductor 41.

The two channel circuitry of the input lines 49 and 51 of the signal sampler circuit 18 serves to provide operation for either polarity of input command signal applied at the input conductor 37. The use of a medium power transistor output amplifier stage 22 including transistors 101 and 103 (instead of driving or energizing the control or load winding 42 of the actuator motor 12 directly by the trigistors output pulses) serves to insure reliable turn off under inductive load conditions, and makes possible a short time constant of the decaying motor current on turn off. This in turn serves to make possible the control of the turn on and turn off times of the transistors 101 and 103 for minimizing radio frequency interference generation.

A resistance loading 105 connected across the single load winding 42 of the actuator motor 12 determines the peak (initial) value of the motor turn off inductive kick voltage. The higher the resistance value of the resistor 105, the higher the inductive kick voltage (and hence, required transistor voltage ratings (but also the lower the time constant of this inductive kick voltage. Since it is desired to have a minimum possible settling time for this transient inductive kick voltage, the trigistors 97 and 99 are so selected as to have high voltage ratings so as to allow the highest possible value of the motor loading resistance 105. Future system testings may relax this requirement of short transient settling time, allowing transistors of lower voltage ratings.

Also the advent of turn off type control rectifiers with high transient ratings and with high turn off current gain may serve to eliminate the transistor output stage 22 by simply driving the motor 12 directly with turn off type control rectifiers replacing the trigistors 97 and 99.

Some additional radio frequency interference filtering time might be needed because of the inherent very fast turn on and turn off times of the silicon controlled rectifiers or trigistors 97 and 99. This generated radio frequency interference would be found present in the conductors leading to the terminals of the motor 12. As hereinafter explained the relaxation oscillator 24 and sampling pulse generator 26 serve to generate pulses needed for the above described pulse width modulator 20.

The relaxation oscillator 24 (see FIGURE 3) includes a unijunction transistor 111 having base elements connected through suitable resistors 112 and 114 across the battery 74 by a conductor 115 leading to the positive terminal of the battery 74 and a grounded conductor 117 leading to the negative terminal of the battery 74. The unijunction transistor 111 further includes a control emitter 118 coupled through a capacitor 119 to the grounded conductor 117 and connected through a resistor 120 and conductor 121 to the cathode of a diode 122 having an anode element connected through the conductor 115 to the positive terminal of the battery 74. The charging capacitor 119 is periodically charged to the threshold firing level of the unijunction transistor 111 at predetermined time intervals dependent upon the selected values of the resistor 120 and capacitor 119.

Figure 4:
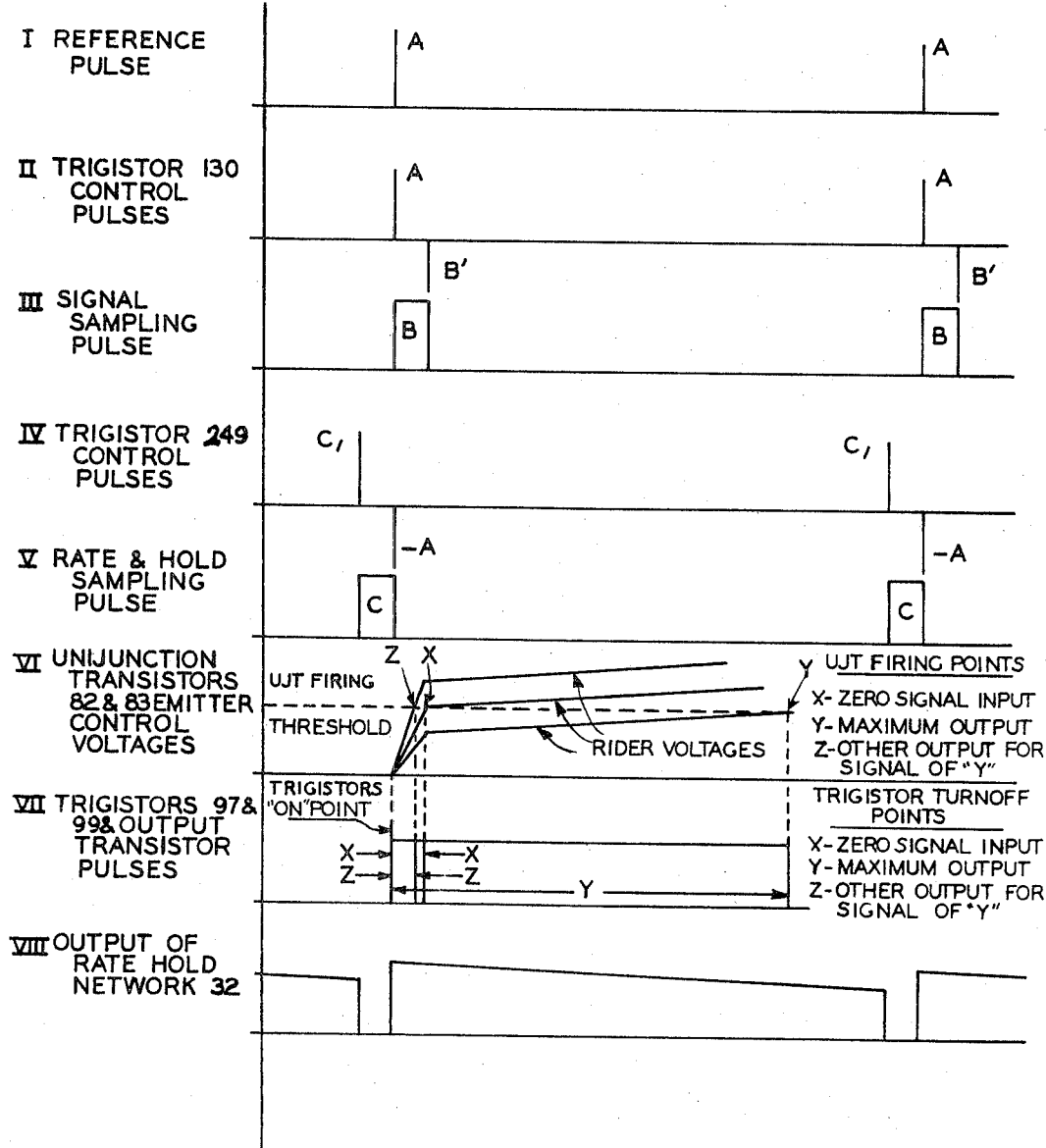
FIGURE 4 is a graphical illustration of the waveforms of the electrical signals effected in the electrical networks of FIGURES 2 and 3 at the designated points.

The arrangement is such as to provide output reference pulses A, as shown graphically at I of FIGURE 4, at predetermined timed intervals applied through an output conductor 123 to the base of a control transistor 125 of the pulse width modulator 20, and through a conductor 124 and positive going diode 122 to the gating terminal 126 of a silicon controlled rectifier or trigistor 130 of the network 26, as shown graphically at II of FIGURE 4, so as to provide at the output of the trigistor 130 signal sampling pulses B, as shown at III of FIGURE 4 and applied through conductors 69 and 71 across the primary winding 68 of the pulse sampling transformer 65.

In addition to the output reference pulses A applied through the conductor 123, such reference pulses are also applied through a primary winding 132 of a transformer 134 having secondary windings 136 and 138. The primary winding 132 is connected across the resistor 114 and has one terminal connected to the output conductor 123 and an opposite terminal connected to the grounded conductor 117.

The secondary winding 136, as shown by FIGURE 3, has one terminal connected through a conductor 139 to the cathode element of the silicon controlled rectifier or trigistor 99 while the opposite terminal of the secondary winding 136 is connected through a conductor 141, resistor 142 and a positive going diode 144 to the gating terminal 145 of the trigistor 99, as shown by FIGURE 2, so as to turn on the trigistor 99 upon the output reference pulse A being applied through the primary winding 132 and thereby induced in the secondary winding 136 of the transformer 134.

Similarly, the output pulse A applied through the conductor 123 and thereby through a conductor 147, shown in FIGURE 2, and the positive going diode 149 to the gating terminal 151 of the trigistor 97 serves to likewise turn on such trigistor 97.

Both the trigistor 97 and the trigistor 99 are turned off respectively by the signal pulses applied in the secondary windings 93 and 95 through negative going diodes 152 and 153 to the gating terminals 151 and 145, respectively, of the trigistors 97 and 99. The signals induced in the secondary windings 93 and 95 correspond with the amplitude of the direct current input signal voltage supplied at conductors 49 and 51, as heretofore explained.

The respective outputs from the trigistor 97 or 99, as the case may be, is in turn applied, respectively, to the bases of the transistor 101 or 103 of the output stage amplifier 22 and thereby across the load winding 42 of the motor 12.

In this connection it may be noted that the transistor 101 has an emitter connected through conductor 75 to the positive terminal of the battery 74 and in response to the output signal from the trigistor 97 serves to control the energization of the load winding 42 of the motor 12 from the source of electrical energy or battery 74. On the other hand, the transistor 103 in response to the signal output of the trigistor 99 serves to control the energizing current to the load winding 42 of the motor 12 applied from a second source of electrical energy or battery 164. The battery 164 has a negative terminal connected through a conductor 165 to the emitter of the transistors 103 while the positive terminal of the battery 164 is connected to ground through a conductor 166.

In the aforenoted arrangement, the collector of the amplifier transistor 101 is connected through a positive going diode 168 to the conductor 104 leading to the load winding 42 of the motor 12 while the collector of the amplifier transistor 103 is connected through a negative going diode 169 to the conductor 104 leading to the load winding 42 of the motor 12. It will be seen then that the transistor 101 controls energization in one sense of the load winding 42 from the battery 74 so as to effect rotation of the motor 12 in one direction while the transistor 103 controls energization of the load winding 42 in an opposite sense from the battery 164 so as to effect rotation of the motor 12 in an opposite direction.

The output pulses applied across the conductors 104 and 203 to the load winding 42 of the motor 12 will be in a polarity sense dependent upon whether the direct current command signal applied at the input 37 is of a positive or negative polarity and these output pulses will be at a repetition rate dependent upon the predetermined time interval of the reference pulses A supplied by the relaxation oscillator 15 through the action of the unijunction control transistor 111, as heretofore explained. Moreover, the duration of these motor control pulses will be dependent upon the amplitude of the direct current command signal applied through the input conductor 37.

Thus the reference pulse A sets the repetition rate of the motor drive pulses applied through the pulse width modulator 20 and serves as a timing reference for all circuit functions.

The pulse generators or unijunction switching transistors 82 and 83 of the pulse width modulator 20 are reset for the start of each new cycle by the pulse A applied through the conductor 123 to the base of the transistor 125 which serves to turn on the transistor 125 for the duration of the pulse A whereupon the transistor 125 acts to discharge the capacitors 71 and 73 through two disconnect diodes 117 and 119. This resetting operation is completed just prior to sampling the direct current signal for initially charging the capacitors 71 and 73.

Besides the reference pulse A, shown graphically at

I and II of FIGURE 4, there are generated two sampling pulses of controlled duration from the occurrence of the pulse A. Similar circuitry is used for both of the sampling pulses. One of the pulses is a sampling pulse B, shown graphically at III of FIGURE 4 for energizing the signal sampler network 18 of FIGURE 2.

This sampling pulse B is generated by the action of the trigistor or silicon controlled rectifier 130, unijunction switching transistor 174 and transistor 176 of FIGURE 3.

Pulse A applied by conductor 123 to a base of transistor 176 serves to reset a timing circuit including resistor 178 and capacitor 180 for the unijunction transistor 174. The resistance capacitor timing circuit 178–180 effectively controls the emitter of the unijunction transistor 174 so as to produce at the output thereof a pulse B', shown graphically at II of FIGURE 4, a predetermined time later than the occurrence of pulse A (for example, two milliseconds) due to a charging of the reset capacitor 180 up to the firing threshold voltage of the unijunction transistor 174. This pulse B' (shown graphically in II of FIGURE 4) is then applied through a primary winding 183 of a coupling transformer 185 in the output of the unijunction transistor 174. The pulse B' is induced in a secondary winding 186 of the transformer 185 and applied thereby through a negative going diode 188 to the gating terminal 126 so as to turn off the silicon controlled rectifier or trigistor 130 (trigistor 130 having been previously turned on by the action of pulse A applied through the conductor 124 and the positive going diode 122).

The output pulse B of the trigistor 130 (FIGURE 3) appearing in the primary winding 67 of the transformer 65 (FIGURE 2) is then a precisely controlled two millisecond rectangular pulse B, as shown graphically at III of FIGURE 4, starting at the end of pulse A and ending at the beginning of pulse B', as shown graphically at II of FIGURE 4.

The other sampling pulse heretofore referred to and denoted as pulse C, shown graphically at V of FIGURE 4, is generated by circuitry, as shown in FIGURE 3, including transistor 245, unijunction transistor 247 and trigistor or silicon controlled rectifier 249, as hereinafter explained.

The pulse C appears at the output of trigistor 249 which is turned on by a pulse $C_1$ and turned off by pulse $-A$, as shown graphically at IV and V of FIGURE 4.

In effecting the output pulse $C_1$, the reference pulse A at conductor 123 is applied through a resistor 244 so as to enter the base of the discharging transistor 245 to serve to reset a timing circuit including resistor 248 and capacitor 250 for the unijunction transistor 247. The resistance capacitor timing circuit 248–250 effectively controls the emitter of the unijunction transistor 247 so as to produce at the output thereof a pulse $C_1$, shown graphically at IV of FIGURE 4, a predetermined time interval after the occurrence of the immediately preceding reference pulse A due to a charging of the reset capacitor 250 up to the firing threshold voltage of the unijunction transistor 247. This pulse $C_1$ (shown graphically in IV of FIGURE 4) is then applied through a conductor 251 and resistor 252 to the gating terminal of the silicon controlled rectifier or trigistor 249 to turn on the trigistor 249.

Thereafter, a reference pulse $-A$ induced in the secondary winding 138 of the transformer 134 and applied through a conductor 252 and negative going diode 253 and resistor 255 to the gating terminal of the silicon controlled rectifier or trigistor 249 is effective to turn off the trigistor 249 a predetermined time later than the occurrence of the pulse $C_1$. The pulse C (shown graphically in V of FIGURE 4) at the output of the trigistor 249 is then a precisely controlled rectangular pulse C, as shown graphically in V of FIGURE 4, starting at the end of pulse $C_1$ and ending at the beginning of pulse $-A$, as shown graphically at V of FIGURE 4.

The pulse C, shown graphically at V of FIGURE 4, is applied to a primary winding 261 of a coupling transformer 263 having output secondary windings 265 and 266. Winding 265 is connected through conductors 271 to control an "inch" transistor chopper device 273 in the rate hold network 32 of the rate feedback loop network 14 while the output winding 266 of the coupling transformer 263 is connected through conductors 275 to control the operation of an "inch" transistor chopper device 277 of a rate voltage sampler network 28 of the rate feedback loop network 14. The output of the rate voltage sampler network 28 is connected to the input of the rate pulse amplifier network 30 while the rate hold circuit 32 has an input connected at the output of the rate pulse amplifier 30, shown in FIGURE 3. The rate pulse amplifier network 30 includes a field effect transistor 281 connected to the output of the "inch" transistor chopper device 277 as well as transistor amplifiers 283 and 285 and an output transistor 287 having a resistor 286 connected between a grounded conductor 288 and an emitter of the transistor 287 with an output conductor 289 and the grounded conductor 288 being coupled across the "inch" transistor chopper device 273 by a coupling capacitor 291. A conductor 41 leads from the output of the chopper device 273 to the adder circuit 34 and thereby to the input of the preamplifier 16.

*Operation*

In explanation of the operation of the forward loop network 10, the direct current command signal applied through the conductor 37 will be selectively effective, dependent upon the polarity thereof, to cause the transistor 45 or the transistors 43–47, as heretofore explained, to apply a more positive control signal through one of the output lines 49 or 51 and a less positive control signal through the other of the output lines 49 or 51.

The positive control signal is then applied by the output lines 49 and 51 through the positive going diodes of the balanced bridges 53 and 55 and through lines leading from one arm thereof to the secondary windings 61 and 63 of the pulse sampling transformer 65 and thereby to the cathode element of the Zener diodes 57 and 59 having an anode element connected to an opposite arm of the respective bridges 53 and 55. The Zener diodes 57 and 59 have a reverse current breakdown characteristic such as to permit a reverse flow of current therethrough upon the sampling pulse B being induced in the secondary windings 61 and 63. The control signal pulse is applied then from the lines 49 and 51 through the bridges 53 and 55 to the windings 61 and 63 and upon the reverse current breakdown of the Zener diodes 57 and 59 effected by the sampler pulse B, the control signal pulse is applied at the respective output lines 66 and 67, with the sampling pulse B being cancelled out at the opposite input and output lines of the balanced bridges 53 and 55.

The breakdown characteristic of the Zener diodes 57 and 59 is sufficiently low however as to prevent a reverse flow of current therethrough in the absence of the sampling pulse B so that in the latter case no positive current flow is effected at either output conductor 66 or 67. On the other hand upon the sampling pulse B being applied to the secondary windings 61 and 63, the Zener diodes 57 and 59 permit the flow of positive current through the output conductors 66 and 67 to effect a charging of the capacitor 71 and 73 during the interval that the sampling pulse B is applied through the primary winding 68 of the pulse sampling transformer 65.

In the event a zero control signal is applied to the input conductors 37 then upon the application of the sampling pulse the current flow effected at the output conductors 66 and 67 by the battery 74 will be of an equal positive value. However, upon the control signal applied at the conductor 37 being of a positive value then the output signal current applied at the output conductor 66 will have a less positive value while the output current applied at the output conductor 67 will have a more positive value. Conversely, upon the input signal applied at the conductor 37 being of a negative value then the output signal applied at the output conductor 66 will have a greater positive value while the output current applied at the output conductor 67 will have a lesser positive value.

The output conductors 66 and 67 thus provide a flow of charging current to the respective capacitors 71 and 73 during the interval that the sampling pulse B is applied through the pulse sampling transformer 65.

Further, the pulse A, as shown graphically at II and III of FIGURE 4, is effective at the initation of the sampling pulse B to act through the conductor 123 on the base of the transistor 125 so as to render the transistor 125 conductive at the start of the signal sampling pulse B while at the same time the pulse A acts through conductor 147 to turn on the trigistor 97 and through conductor 141 to turn on the trigistor 99.

The transistor 125 then provides a discharge path for the capacitor 71 through the diode 117 and another discharge path for the capacitor 73 through the diode 119. Thereafter, the charging cycle for the capacitors 71 and 73 is effective for the period of the signal sampling pulse B and the charge thus applied to the capacitor 71 and 73 upon reaching the firing level of the unijunction transistors 82 and 83 acts to render the same conductive.

Thus, for example, as shown graphically at VI and VII of FIGURE 4, upon a zero signal input being applied at the conductor 37, the control voltage applied at the emitters of the unijunction transistors 82 and 83 will be of equal value and of a value indicated by the line X of the graph VI resulting in the transistors 82 and 83 both firing at the same time to apply a control pulse in the windings 93 and 95 at the same time to turn off the trigistors 97 and 99 as indicated graphically at VII of FIGURE 4 by X. Since the outputs then of the trigistors 97 and 99 will be of equal value at the same time and of opposite polarity, the positive collector output applied through the transistor 101 by the battery 74 will pass directly through diodes 168 and 169 and in turn through the transistor 103 to the negative terminal of the battery 164 returning through the grounded connection 166 to the negative terminal of the battery 74.

However, upon a positive or negative direct current signal voltage being applied through the input conductor 37, the charge applied to one or the other of the capacitors 71 and 73 will be greater so that the control voltage applied to the emitter of one or the other of the transistors 82 or 83 will cause the unijunction transistors 82 or 83 controlled by the capacitor 71 or 73 having the greater positive charge applied thereto to fire at point Z, as indicated graphically at VI of FIGURE 4, while the other of the unijunction transistors 82 or 83 controlled by the capacitor 71 or 73 having the lesser positive charge applied thereto will fire at the point Y, as the charge applied to the latter controlling capacitor is built up by the charging current applied through resistor 77 or 78 by the battery 74 to the critical firing level of the unijunction transistor, as indicated at VI of FIGURE 4. This action will then cause the transistor 82 or 83 controlled by the greater charged capacitor 71 or 73 to first apply a controlling pulse to the primary winding 85 or 87 acting through coupling transformer 89 or 91 to turn off the trigistor 97 or 99 controlled thereby at the point Z, while the last to fire unijunction transistor 82 or 83 controlled by the lesser charged capacitor will apply a pulse through the coupling transformer 89 or 91 acting to turn off the trigistor 97 or 99 at the point Y upon the charge on such capacitor increasing to the firing level of the other unijunction transistor thus acting to apply an energizing pulse for the motor 12 through the transistor 101 or 103, as the case may be, of the duration Y indicated graphically in FIGURE 4 by VII.

This motor energizing pulse will be applied across output lines 104 and 79 and will be for a duration variable with the amplitude of the input command signal 37. In this operation it will be seen that the pulse width modulator 20 in effect converts the amplitude modulated output of the signal sampler 18 to a constant amplitude recurring pulse in the load winding 42 of the motor 12 having a pulse width proportional to the amplitude of the input signal applied to the input conductor 37. The unijunction transistors 82 or 83 are thereby selectively operable in the sense that one precedes the other dependent upon the polarity of the input command signal applied to the conductor 37. This input command signal in turn controls the trigistors 97 or 99, as the case may be, to effect the constant amplitude pulse of the width proportional to the amplitude of the input signal at the output of the transistor 101 or 103 which in turn delivers these pulses to the load winding 42 of the direct current motor actuator 12.

The pulse thus applied to the load winding 42 of the motor 12 will cause rotation of the motor in one direction when effected through the transistor 101 and in an opposite direction when affected through the transistor 103 which action is in turn controlled by the polarity of the direct current command signal applied through the conductor 37.

Furthermore, during the intervals of interruption between each energizing pulse applied to the load winding 42 of the motor 12, there will be generated across the winding 42 a back electromotive force of a polarity dependent upon the direction of rotation of the motor effected by the command signal applied through the conductor 37 and of an amplitude variable with the speed of rotation of motor 12.

This sampled armature voltage is applied through the rate feedback loop network 14, as hereinafter explained, to the adder network 34 as a direct current signal of a polarity acting in opposition to the command signal applied through the conductor 37 to provide a desired damping action on the control of the motor 12.

In explanation of the rate feedback loop 14, it will be noted that there is provided the "inch" transistor chopper device 277 in the rate voltage sampler circuit 28 which acts with each sampling pulse C to sample the voltage across the motor load winding 42 applied through the conductor 201 and grounded conductor 203 when the pulse drive voltage applied across the conductors 104 and 79 to the load winding 42 of the motor 12 drops to zero near the end of the drive pulse cycle.

It will be noted that, as shown graphically at III and V of FIGURE 4, the rate and hold sampling pulse C immediately precedes in time the signal sampling pulse B and at the time of the sampling pulse C (after a motor turn off transient has settled out) the motor output voltage applied across the lines 201 and 203 is due to the speed of rotation only of the motor 12 so that the sample signal from this motor voltage is a rate signal (i.e., amplitude of the sample pulse is proportional to the speed of rotation of the motor 12 which is in turn dependent on the amplitude of the command signal voltage at input 37 while its sign is dependent on the direction of rotation of the motor 12 which is in turn dependent on the polarity of the command signal voltage at input 37).

The "inch" device 277 has a very low coupling between its energizing pulse applied across the lines 275 and the signal applied across the lines 201 and 203. The arrangement is such as to require no matched components and provides simplicity and small size.

The rate pulse amplifier 30 includes a field effect transistor 281 for gain and high input impedance, two common emitter transistor stages 283 and 285 for gain and a transistor 287 providing an emitter follower output and a low output impedance to the rate hold network 32. The transistor stages 285 and 287 are coupled by a resistance-capacitance network 284 to avoid the drift which would occur had a direct coupled direct current amplifier arrangement been used.

A field effect input stage 281, by requiring no bias connections at its input, allows direct coupling to the output of the "inch" transistor chopper device 277. If instead, bias current were supplied to this input circuit with direct coupling to the chopper device 277, operation of the chopper device would alter the bias circuit and produce pulse outputs even upon a zero signal voltage being sampled. Direct coupling not only saves a capacitor (reducing circuit complexity, cost and size), but eliminates the slope-off and back swing distortion produced by a resistance-capacitance coupling of pulse amplifier circuits. To minimize slope-off and back swing distortion, a time constant of the resistance-capacitance coupling elements must be long compared to the pulse duration.

Operation of the output hold circuit 32 is as follows: the "inch" transistor chopper device 273 in the hold circuit 32 is closed by the sampling pulse C, shown graphically at V of FIGURE 4, and which is identical to that effective to close the "inch" transistor chopper device 277 provided in the rate voltage sampler network 28.

The closing of the chopper device 273 connects the coupling capacitor 291 immediately across the output of the rate hold network 32 for the interval of the pulse C, as shown graphically at VIII of FIGURE 4. Thus, an amplified sample signal pulse appears at the output of emitter follower 287 at the same time that the "inch" transistor chopper device 273 connects the capacitor 291 across the output of the emitter follower transistor 287.

The capacitor 291 quickly charges up to the quiescent direct current voltage and the amplified sampled signal pulse, with a short time constant due to the low output impedance of the emitter follower resistor 286 and the low saturated resistance of the "inch" transistor chopper device 273.

When the puse C is terminated, the "inch" transistor chopper device 273 opens and the voltage across it or hold output voltage, is a series combination of the voltage across the capacitor 291 and voltage across the resistor 286 in the output of the emitter of the transistor 287. While pulse C, shown graphically at V of FIGURE 4, was present, these voltages were equal but now they have become unequal by the amount of the amplified sampled signal pulse. The reason for this is that passage of the signal sampling pulse C allows the voltage across resistor 286 to change back to its quiescent value while the voltage across the capacitor 291 remained as before except for slow leakoff due to loading on the hold circuit output applied through conductor 41. Thus the output of the hold network 32, as shown at VIII of FIGURE 4, is a held direct current voltage level of an amplitude equal to and polarity opposite to the amplified signal pulse appearing across resistor 286. This rate signal from the hold circuit 32 then is connected back through the adder circuit 34 to the servo input signal terminals as rate feedback so as to complete the rate loop 14.

The present invention is directed to the novel pulse width modulated servo drive control system described and claimed herein with reference to FIGURES 1, 2, 3 and 4. The novel method of controlling a direct current motor described herein is the subject matter of a U.S. application Ser. No. 484,528 filed Sept. 2, 1965, by Harold Moreines; the novel preamplifier network 16 of FIGURE 2 is the subject matter of a U.S. application Ser. No. 489,627 filed Sept. 23, 1965 by Robert L. James; the novel signal sampler network 18 of FIGURE 2 is the subject matter of a U.S. application Ser. No. 489,640 filed Sept. 23, 1965 by Robert L. James; the novel pulse width modulator network 20 of FIGURE 2 is the subject matter of a U.S. application Ser. No. 491,326 filed Sept. 29, 1965 by Robert L. James; the novel two channel trigistor output stage motor control system 20–22 of FIGURE 2 is the subject matter of a U.S. application Ser. No. 491,585 filed Sept. 30, 1965 by Robert L. James, now U.S. Patent No. 3,398,345, granted Aug. 20, 1968; the novel timing network 15 of FIGURE 3 is the subject matter of a U.S. application Ser. No. 698,564 filed Jan. 17, 1968 as a division of U.S. application Ser. No. 496,428 filed Oct. 15, 1965 by Robert L. James; the novel timing network for the modulated servo drive control system of FIGURES 2 and 3 is the subject matter of the U.S. application Ser. No. 496,428; and the novel rate feedback loop network 14 of FIGURE 3 is the subject matter of a U.S. application Ser. No. 496,577 filed Oct. 15, 1965 By Robert L. James, now U.S. Patent No. 3,378,745, granted Apr. 16, 1968. All of the foregoing applications and patents have been assigned to The Bendix Corporation, the assignee of the invention described and claimed herein.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In a control system of a type including an electric motor and a load winding for controlling rotation of the motor; the combination comprising a control network for the winding including a pulse width modulator, means for supplying a variable command voltage, means responsive to the command voltage for controlling the pulse width modulator so as to provide output pulses of a width variable directly with the amplitude of the command voltage, means operatively connecting the output pulses from the pulse width modulator to the load winding to provide energizing pulses for controlling the rotation of the motor, and means for supplying to the control network a rate feedback direct current voltage acting in opposition to the command voltage and of an amplitude proportional to back electromotive forces generated across said load winding by the rotation of the motor during intervals of interruption between said energizing pulses, the means for supplying the rate feedback voltage to the control network including means for sampling the electromotive forces generated across the load winding of the motor, other means for storing the sampled electromotive forces in a hold circuit during the intervals of application of the energizing pulses to the load winding of the motor, said hold circuit including means generating a continuous velocity signal voltage from the stored electromotive forces, and an adder network for applying the command voltage and the velocity signal voltage in opposing relation to the voltage responsive means for controlling the pulse width modulator.

2. The combination defined by claim 1 including means for supplying reference pulses to the pulse width modulator so as to set the repetition rate of the output pulses applied by the pulse width modulator to the load winding of the motor, and means for supplying other reference pulses to the sampling means and the velocity signal generating means in synchronism with the first mentioned reference pulses so as to cause the sampling means to be periodically effective during the intervals of interruption between said energizing pulses and the means for generating said velocity signal voltage to be periodically effective for applying the velocity signal voltage to the adder network in opposition to the command voltage to provide a resultant voltage applied to the voltage responsive means for controlling the pulse width modulator so as to effect the energizing pulses for controlling the rotation of the motor.

3. In a control system of a type including an electric motor and a load winding for controlling rotation of the motor; the combination comprising a control network for the winding including a pulse width modulator, means for supplying a variable command voltage, means responsive to the command voltage for controlling the pulse width modulator so as to provide output pulses of a width variable directly with the amplitude of the command voltage, means operatively connecting the output pulses from the pulse width modulator to the load winding to provide energizing pulses for controlling the rotation of the motor, and means for supplying to the control network a rate feedback direct current voltage acting in opposition to the command voltage and of an amplitude proportional to back electromotive forces generated across said load winding by the rotation of the motor during intervals of interruption between said energizing pulses, means for supplying reference pulses to the pulse width modulator so as to set the repetition rate of the output pulses applied by the pulse width modulator to the load winding of the motor, and means for supplying other reference pulses to the rate feedback voltage supply means in synchronism with the first mentioned reference pulses so as to cause the back electromotive forces to be sampled during the intervals of interruption between the energizing pulses for controlling the rotation of the motor and the rate feedback direct current voltage to be supplied to the control network during other times.

4. In a control system of a type including an electric motor, and a load winding for controlling the rotation of the motor; the combination comprising a control network for the winding including a pulse width modulator, means for supplying a variable command signal voltage, means responsive to an error signal voltage for controlling the pulse width modulator so as to provide output signal pulses of a duration variable with the amplitude of the error signal voltage, means operatively connecting the output pulses from the pulse width modulator to the load winding for effecting rotation of the motor, means for supplying rate feedback pulses in response to electromotive forces generated across said load winding by rotation of the motor, periodically operable means for sampling said rate feedback pulses during intervals of interruption between said energizing pulses, means operative in synchronism with said periodically operable means for storing said sampled rate feedback pulses, said storing means including means thereafter operable for generating from said stored rate feedback pulses a direct current feedback signal voltage, and an adder network for combining in opposing relation said command signal voltage and said feedback signal voltage to effect the error signal voltage for controlling the pulse width modulator.

5. The combination defined by claim 4 in which the control network includes a preamplifier including a pair of input channels selectively operative through the adder network dependent upon the polarity of the command signal voltage.

6. The combination defined by claim 5 including means to supply reference pulses to the pulse width modulator so as to set the repetition rate of the output pulses applied by the pulse width modulator to the load winding of the motor.

7. In a control system for an electric motor, the combination comprising a pulse generator for effecting energizing pulses for the motor in response to a controlling signal voltage, means for periodically sampling back electromotive forces generated by the motor at intervals between the energizing pulses, and means for providing a damping signal voltage from the sampled back electromotive forces acting in opposition to the controlling signal voltage, the sampling means including a rate voltage sampler network, the means for providing the damping signal voltage including a rate voltage hold network, means operatively connecting the rate voltage sampling network to the rate hold network, means to periodically render the rate voltage sampler network effective to sample the back electromotive forces generated across the motor, and means to periodically cause the rate hold network to apply the damping signal voltage in opposing relation to the controlling signal voltage of the pulse generator to effectively dampen the operation thereof.

8. In a control system of a type including an electric motor, and a load winding for controlling the rotation of the motor; the combination comprising a control network for the winding including a pulse width modulator, means for supplying a variable command voltage, means for sampling the command voltage, means responsive to the sampled command voltage for controlling the pulse width modulator so as to provide output pulses of a width variable directly with the amplitude of the sampled command voltage, means operatively connecting the output pulses from the pulse width modulator to the load winding for controlling the rotation of the motor, timing means for supplying reference pulses to the sampling means and to the pulse width modulator to thereby control the sampling of the command signal voltage and the repetition rate of the output pulses applied by the pulse width modulator to the load winding of the motor, means for supplying to the control network a rate feedback direct current voltage acting in opposition to the command voltage and of an amplitude proportional to the electromotive force generated across said load winding by the rotation of the motor during intervals of interruption between the output pulses provided by the pulse width modulator, the rate feedback means including means for sampling the back electromotive forces generated across the load winding by the rotation of the motor, means for holding said sampled electromotive forces, said timing means including means for supplying reference pulses to the electromotive force sampling means to render the same effective to sample the electromotive forces generated across said load winding during intervals of interruption between the output pulses provided by the pulse width modulator, and said timing means including other means for supplying said reference pulses to the means for holding the sampled electromotive forces so as to render said holding means effective for applying said sampled electromotive forces to the control network at intervals between said reference pulses so as to provide a rate feedback direct current voltage acting in opposition to the command voltage.

9. In a control system of a type including an electric motor, and a load winding for controlling the rotation of the motor; the combination comprising a control network for the winding including a pulse width modulator, means for supplying a variable command voltage, means for sampling the command voltage, means responsive to the sampled command voltage for controlling the pulse width modulator so as to provide output pulses of a width variable directly with the amplitude of the sampled command voltage, means operatively connecting the output pulses from the pulse width modulator to the load winding for controlling the rotation of the motor, timing means for supplying reference pulses to the sampling means and to the pulse width modulator to thereby control the sampling of the command signal voltage and the repetition rate of the output pulses applied by the pulse width modulator to the load winding of the motor, the timing means including an oscillator network for supplying reference pulses to the pulse width modulator to set the repetition rate of the output pulses applied by the pulse width modulator to the load winding of the motor, a sampling pulse generator network controlled by the reference pulses supplied by the oscillator network, said oscillator network including a first timing network controlled by said reference pulses and effective to supply sampling pulses of predetermined timed intervals to the sampler means for controlling the sampling period of the command voltage, and second timing means controlled by the reference pulses for supplying control pulses for controlling the sampling period of the motor rate voltage sampler network and the hold period of the rate hold network.

10. In a control system for an electric motor, the combination comprising a pulse generator for effecting energizing pulses for the motor, means for sampling a controlling signal voltage, said sampling means including means for supplying said sampled controlling signal voltage to the pulse generator, said pulse generator including means for effecting the energizing pulses of a width proportional to the amplitude of the controlling signal voltage, means for sampling back electromotive forces generated by the motor during intervals between said energizing pulses, other means for holding said sampled electromotive forces during said sampling interval, and said holding means providing a damping signal voltage acting in opposition to the controlling signal voltage during periods between said sampling intervals.

11. In a control system of a type including an electric motor and a load winding for controlling rotation of the motor; the combination comprising a control network for the winding including a pulse width modulator, means for supplying a variable command voltage, first means periodically effective to sample the command voltage, means responsive to the command voltage sampled by said first means for controlling the pulse width modulator so as to provide output pulses of a width variable directly with the amplitude of the sampled command voltage, means operatively connecting the output pulses from the pulse width modulator to the load winding to provide energizing pulses for controlling the rotation of the motor, second means periodically effective to sample back electromotive forces generated across the load winding by the rotation of the motor, third means responsive to the back electromotive forces sampled by said second means and periodically effective for supplying to the control network a rate feedback direct current voltage acting in opposition to the command voltage and of an amplitude proportional to the sampled back electromotive forces generated across said load winding by the rotation of the motor, and synchronizing means for rendering the first, second and third means periodically effective in a predetermined timed relation, the second sampling means being rendered effective during intervals of interruption between said energizing pulses and the third means being rendered effective during intervals of interruption between the effective periods of the second sampling means.

References Cited

UNITED STATES PATENTS

| | | | |
|---|---|---|---|
| 2,905,876 | 9/1959 | Hillman | 318—331 X |
| 3,027,505 | 3/1962 | Auld | 318—331 |
| 3,214,666 | 10/1965 | Clerc | 318—331 X |
| 3,273,035 | 9/1966 | Inderhees | 318—20.550 X |

ORIS L. RADER, *Primary Examiner.*

G. NUNEZ, *Assistant Examiner.*

U.S. Cl. X.R.

318—18, 341, 345, 368